Nov. 30, 1948.  A. L. PARKER  2,455,087
SEALING ELEMENT FOR VALVES
Filed July 27, 1943  2 Sheets-Sheet 1
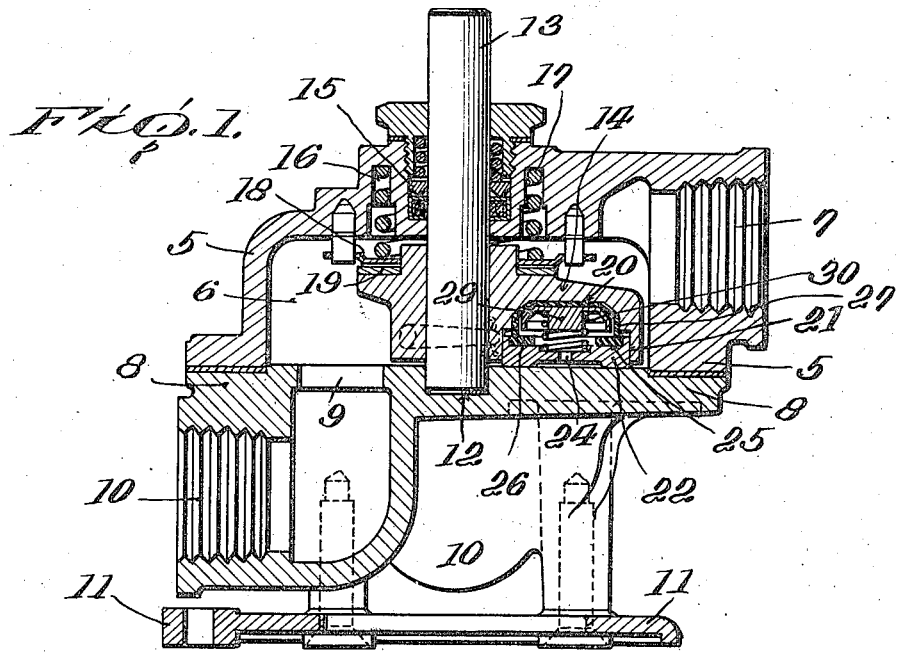
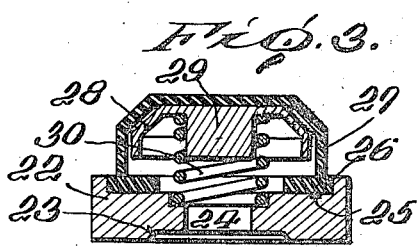
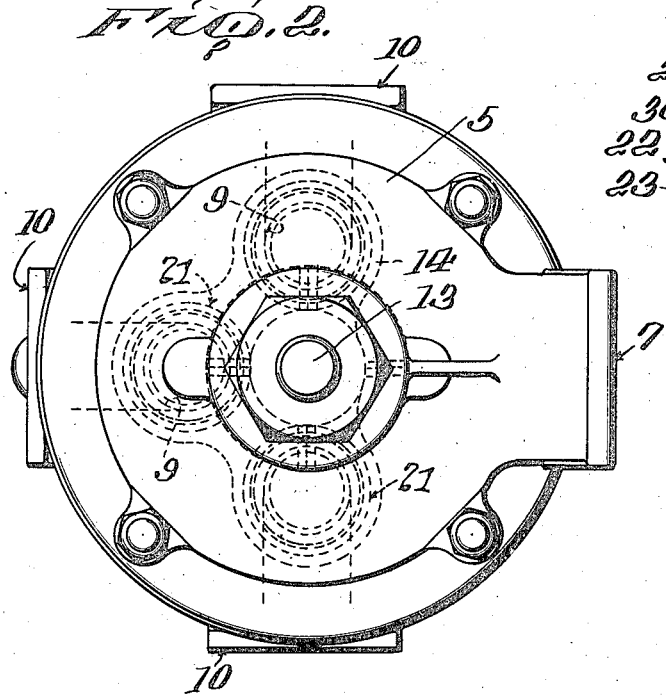
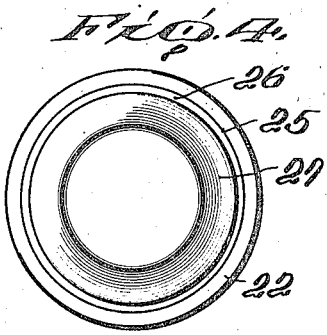
Inventor
Arthur L. Parker
By Mason, Porter & Diller
Attorneys Nov. 30, 1948.    A. L. PARKER    2,455,087
SEALING ELEMENT FOR VALVES
Filed July 27, 1943    2 Sheets-Sheet 2
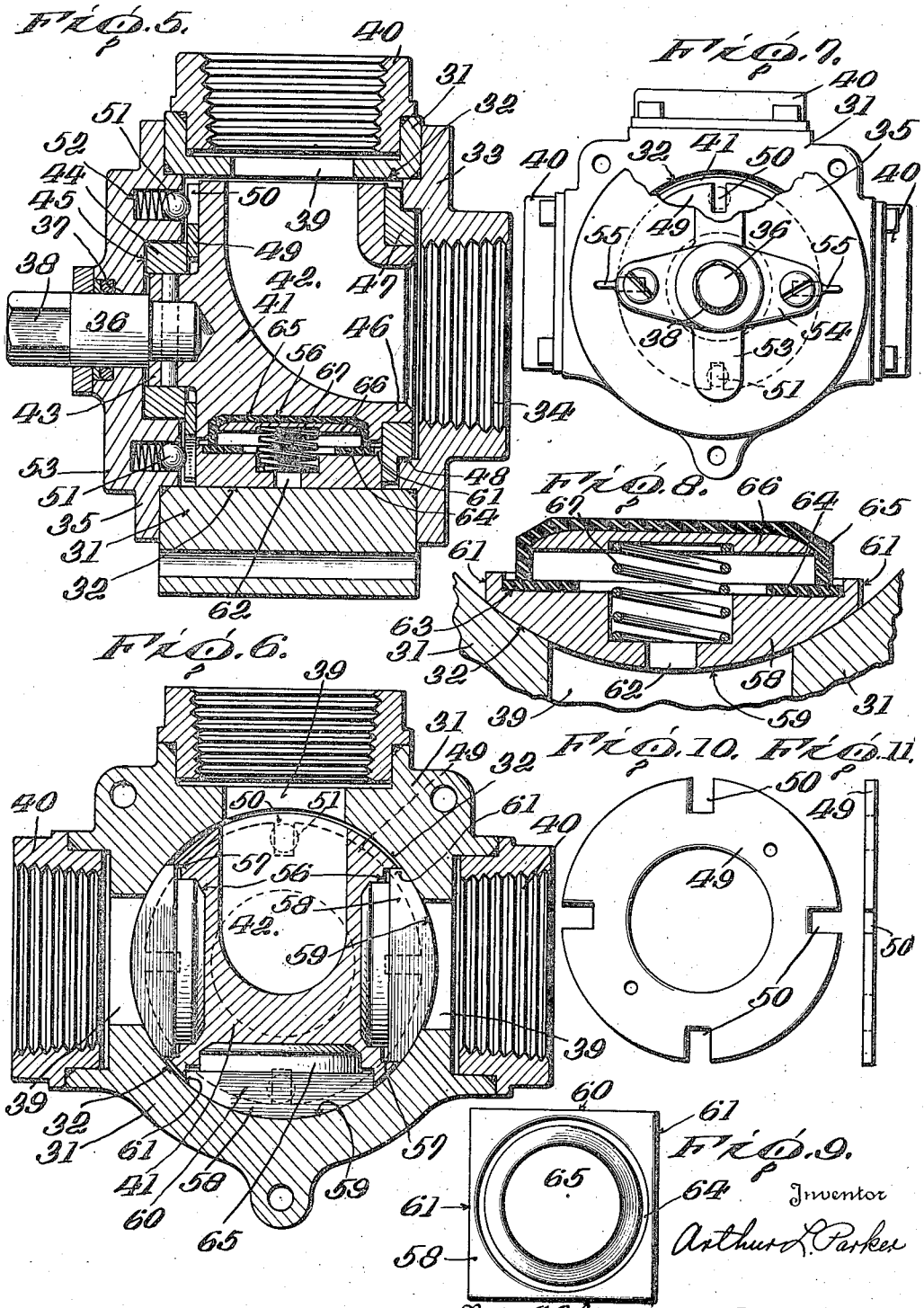
Inventor
Arthur L. Parker
By Marron, Porter & Miller
Attorneys Patented Nov. 30, 1948

2,455,087

UNITED STATES PATENT OFFICE 2,455,087

SEALING ELEMENT FOR VALVES

Arthur L. Parker, Cleveland, Ohio, assignor to The Parker Appliance Company, Cleveland, Ohio, a corporation of Ohio Application July 27, 1943, Serial No. 496,313

3 Claims. (Cl. 251—90)

The invention relates generally to valve structures wherein are included a casing having at least one inlet port and at least one outlet port, a valve chamber into and from which a controlled flow of fluid is to be effected, and a valve element movable in said chamber for controlling said flow, and it primarily seeks to provide a novel form of sealing element for engaging over said inlet port equipment and adapted to accomplish its sealing function efficiently and in a manner permitting movement of the valve element with a minimum of effort.

An object of the invention is to provide in a valve structure of the character stated, a novel form of sealing element movable with a valve element which does not contact with the wall of the casing chamber in which it moves the sealing element alone having slide contact with said wall and being constructed and arranged so that a desired constant seating pressure will be applied thereto regardless of the fluid pressure acting to unseat the same.

Valve structures have been provided heretofore in which the movable valve elements have been spaced from the valve chamber walls and in which the port sealing is effected by sealing elements which are hollow and have provision for fluid to enter them and tend to balance the fluid pressure at opposite sides of said elements and thereby provide for the desired port sealing and yet permit movement of the valve elements with a minimum of effort. Such valve structures are shown in U. S. Letters Patents 2,209,135 and 2,314,512 issued to A. L. Parker on July 23, 1940 and March 23, 1943, respectively. It is the purpose of the present invention, however, to provide an improved form of sealing element in the nature of a self contained unit comprising a valve chamber wall engaging plate having a central opening therethrough to permit passage of fluid under pressure, a rubber-like resilient shell attached to said plate and forming an expansible and contractible fluid pressure chamber over said plate opening, and spring means tending to expand the shell chamber and press said plate against the opposing valve chamber wall.

Another object of the invention is to provide a self contained sealing unit of the character stated in which the expansible and contractible shell is dimensioned to present a greater pressure area directed toward the valve seating port than is presented against the unit plate without said chamber at a port covered thereby, thereby to cause the fluid pressure within the unit chamber to augment the action of the spring in holding said plate against its seat.

With the above and other objects in view that will hereinafter appear, the nature of the invention will be more fully understood by following the detailed description, the appended claims and the several views illustrated in the accompanying drawings.

In the drawings:

Figure 1 is a vertical cross sectional view illustrating a valve structure embodying the invention.

Figure 2 is a plan view of the valve structure illustrated in Figure 1.

Figure 3 is an enlarged detail cross sectional view of one of the sealing units embodied in the valve structure of Figures 1 and 2.

Figure 4 is a detailed plan view of the sealing unit illustrated in Figure 3.

Figure 5 is a central vertical longitudinal section of another form of valve structure embodying the invention.

Figure 6 is a central vertical cross section of the valve structure illustrated in Figure 5.

Figure 7 is a left end elevation of the valve structure illustrated in Figure 5, a portion of the end closure cap being broken away.

Figure 8 is an enlarged fragmentary cross sectional view illustrating in detail one of the sealing units embodied in the valve structure of Figures 5, 6 and 7.

Figure 9 is a plan view of the sealing unit shown in Figure 8.

Figures 10 and 11 illustrate in face and edge view respectively the detent ring employed in the valve structure of Figures 5 to 7.

In the example of embodiment of invention disclosed in Figures 1 to 4 there is included the casing or shell 5 having a valve chamber 6. The casing is equipped with an outlet 7 through which fluid is to be delivered from a selected one of a plurality of sources as will hereinafter become apparent.

The valve chamber 6 is closed by a flat wall plate 8 which is removably secured to the casing or shell 5, and the wall plate 8 is equipped with three inlet ports 9 which extend through the plate into the valve chamber 6. Each of the ports 9 communicates with an individual inlet 10, three being shown in the form of valve illustrated in Figures 1 and 2. Each of the units is adapted to be connected with a liquid fuel supply tank or other suitable individual sources of supply from which fluid is to be selectively delivered to and through the previously mentioned outlet 7.

A mounting plate 11 is secured to the wall plate 1 in the manner clearly illustrated in Figure 1 so that the valve unit can be suitably anchored for use.

A bearing seat 12 is provided in the upper surface of the wall plate 8 and provides a bearing for one end of a valve stem or shaft 13 on which is secured a valve element or rotor 14 adapted to be swung about within the valve chamber 6 for selecting the particular inlet port 9 which is to serve fluid to the outlet 7.

The other or upper end of the valve stem or shaft 13 passes through a packed gland 15 and is adapted to have a suitable form of turning element attached thereto.

An annular recess is formed in the casing 5 surrounding the gland 15 and serves as a mounting for a compression spring 17 which is effective to yieldably press the pin anchored detent plate 18 against the detent ring 19 which is attached to the rotor 14. The detent equipments 18, 19 serve in the manner well known in the art to retain the rotor in the inlet or feeder port selecting positions to which it is moved.

The undersurface of the rotor 14 is provided with three pockets or recesses 20, and each recess is counterbored as at 21 to slidably receive the sealing disk 22 of a sealing unit such as is illustrated in detail in Figures 3 and 4. Each sealing unit removably mounted in one of the recesses in the rotor as illustrated in Figure 1 serves to effectively seal one of the feeder or inlet ports 9 when positioned thereover, and it will be observed by reference to Figure 1 of the drawings that the disks 22 alone contact the wall plate 8, the rotor 14 being entirely out of contact with the valve casing structure. It will be observed by reference to Figure 3 of the drawings that each sealing disk 22 is provided with a bottom face recess 23 and a central aperture 24. Each disk preferably is formed of non-metallic or composition material and includes an upper surface recess 25 for receiving a base ring portion 26 of a hollow, integral, deformable and resilient shell 27, preferably of rubber or a suitable substitute, said base ring portion 26 being bonded to the respective disk in a manner for forming a sealed pressure chamber above said disk 22 and having inlet and outlet through the respective center aperture 24. When the sealing units are mounted in the valve structure the rubber shell 27 of each unit projects up into one of the receiving recesses 20 in the rotor 14. A plunger member 28 engages the upper surface of and within each rubber shell 27, and each plunger head includes a depending plunger 29. A compression spring is interposed between each disk 22 and the overlying plunger head 28 and yieldably urges the rubber shell 27 to its extended position illustrated in Figure 3. It is to be understood that Figure 3 illustrates the extended condition of the sealing unit and that in this extended condition the depth of the sealing unit is greater than the space in which it is to be mounted in the manner illustrated in Figure 1. Thus it will be apparent that when the sealing units are mounted as illustrated in Figure 1 they are under compression and the disks 22 will be firmly pressed against the underlying surface of the wall plate 8.

It will be apparent by reference to Figures 1 and 2 of the drawings that the rotor 14 can be turned to uncover individual feeder or inlet ports 9 so as to render the multiple of ports selectively effective to supply fluid to and through the outlet 7. It will be apparent also that whenever a sealing unit is registered over one of the inlet ports fluid under pressure will be admitted through the disk aperture 24 into the interior of the sealed chamber within the rubber shell 27. The surface within the rubber shell against which the fluid exerts a downward pressure toward the wall plate 8 being greater than the undersurface of the disk 22 exposed to fluid pressure through the port 9, the pressure within the shell will augment the pressure of the spring 30 in effecting an efficient sealing contact of the disk with the upper surface of the wall plate 8. While it is preferred that the pressure within the shell shall overbalance the pressure without the shell and beneath the disk tending to unseat the same, it may be found desirable in some installations to dimension the parts so as to balance these pressures, in which case only the spring pressure, or the resiliency of the shell in cases in which no spring is provided, is effective to seat the disk. A balanced pressure such as this is desirable in some instances in that it provides for a uniform turning torque of the valve regardless of the extent of variation of fluid pressure in the valve.

In the example of embodiment of the invention illustrated in Figures 5 to 11 there is included a generally cylindrical casing or shell 31 having a cylindriform valve chamber 32 and one open end thereof closed by a removable end cap 33 having a centrally disposed outlet 34. The other open end of the casing or shell 31 is closed by a removable end cap 35 through which projects a valve stem or shaft 36, the latter being rotatably mounted in a sealed bearing 37 in said cap. The non-circular end 38 of the valve stem is adapted to receive any acceptable form of turning element.

The valve casing or shell is equipped with three inlet ports 39 each communicating between the valve chamber 32 and a removably mounted adapter inlet 40. As in the previously described form of valve, it is intended that the inlets 40 be connected with a plurality of liquid fuel tanks or other individual fluid sources and that the valve be equipped to selectively deliver fluid from said sources to and through the single outlet 34.

A valve element or rotor 41 is rotatably mounted within the valve chamber 32, and this rotor is equipped with an elbow passage 42 for effecting selective communication between the plurality of inlets 40 and the single outlet 34 as above stated.

The valve element 41 is provided with a hub 43 at one end which is secured to the end of the valve stem 36 which extends into the valve chamber in the manner clearly illustrated in Figure 5. A bearing ring 44 preferably formed of non-metallic or composition material is press fitted on the hub 43 and is freely rotatable in a recess 45 provided therefor in the end closure cap 35.

The other end of the rotor 41 also is provided with a hub or boss 46 on which another non-metallic bearing ring 47 is press fitted, said ring being freely rotatable in the recess 48 provided therefor in the end closure cap 33. The stem end of the rotor 41 also has secured thereto a detent ring 49 having four equidistantly spaced recesses 50 formed in the edge thereof in the manner clearly illustrated in Figures 5, 7, 10 and 11 of the drawings. The detent ring 49 is yieldingly engaged by spring pressed balls or detents 51 which are mounted in pockets 52 provided in a cross boss 53 on the cap 35. See Figures 5 and 7. It will be obvious that the detent equipments 51, 50 will serve to yieldably retain the rotor 41 in port registering positions to which it is shifted. A screw attached cross piece 54 serves to hold the packing in place in the bearing 37, and this piece may be provided with end lugs 55 effective to serve as positioning stops engageable by any suitable turning handle which may be applied to the non-circular end portion 38 of the valve stem 36.

The valve rotor 41 is provided with three circular surface recesses 56 arranged in the manner clearly illustrated in Figure 6 so that they may be simultaneously disposed to register with all three inlet ports 39, or moved to bring a selected one of the inlet ports 39 into communication with the outlet 34 through the elbow passage 42. Each recess 56 opens into a square face opening 57 disposed between the bearing ring 47 and the detent ring 49 mounted at the respective ends of the rotor. Each square opening 57 serves as a slide guide for a square sealing plate 58 preferably formed of non-metallic or composition material and forming a part of a sealing unit such as is illustrated in detail in Figures 8 and 9. Each plate is provided with an arcuate outer surface for smoothly contacting the cylindrical inner surface of the valve casing or shell 31 in the manner clearly illustrated in Figures 5, 6 and 8, and said plate also includes straight sides 60 and straight ends 61 which are accurately guided in the receiving spaces provided therefor in the rotor 41.

It will be observed by reference to Figures 5 and 8 of the drawings that each sealing unit plate is equipped with a central aperture 62 through which fluid pressure can pass from the registering inlet port 39 into the space above the respective sealing plate 58. The upper surface of each sealing plate is equipped with a surface recess 63 for receiving a base ring portion 64 of a hollow integral, deformable shell 65, preferably of rubber or a suitable substitute, and bonded to said plate in a manner for providing a sealed pressure chamber above the respective sealing plate 58 and having inlet and outlet communication through the respective plate aperture 62. Each deformable, resilient shell 65 is received in one of the circular recesses 66 provided in the valve rotor 41. A plunger head 66 opposes the upper extremity of each said shell 65, and a compression spring is interposed between each plunger head 66 and the underlying sealing plate 58. As was explained in connection with the sealing units employed in the valve structure of Figures 1 to 4, the sealing unit of Figure 8 is of a depth dimension greater than the space in which it is confined in the rotor and valve casing so as to place the unit under compression and cause the sealing plate 58 to be tightly pressed against the opposing cylindrical surface of the casing or shell 31.

It will also be observed that the surface within each sealing unit against which pressure of fluid admitted through the plate aperture 62 is exerted downwardly against the plate is greater than the area of surface exposed to fluid pressure through the registering port 39 and therefore the fluid pressure within the sealed chamber in the rubber shell will augment the action of the spring 67 in efficiently pressing the respective sealing plate 58 against its seat. As before stated, however, the parts may be dimensioned so as to balance the pressures tending respectively to seat and unseat the sealing plate so as to make the spring alone dominant to exert seating pressure and provide for a uniform turning torque of the valve regardless of the extent of variation of fluid pressure in the valve.

It is of course to be understood that the details of structure and the arrangement of parts may be variously changed and modified without departing from the spirit and scope of the invention.

I claim:

1. A sealing unit for valve structures comprising a sealing member having an aperture therethrough and having an inner face and an outer sealing face, and a deformable resilient shell bonded to the inner face of said sealing member and forming a sealed chamber over the aperture, and spring means interposed between the sealing member and the shell within the sealed chamber and constantly tending to distend the shell, said spring means including a plunger head conforming generally to the shape of the shell portion remote from said sealing member.

2. In a valve, casing structure having an inlet and an outlet and including a wall at least in part defining a valve chamber and having a port therein adapted when uncovered to open communication between said inlet and outlet, a valve element shiftably mounted in said chamber, and a sealing unit movable with said valve element for covering or uncovering said port, said sealing unit comprising a sealing member having an aperture therethrough and having an inner face and an outer sealing face, and a deformable resilient shell bonded to the inner face of said sealing member and forming a sealed chamber over the aperture, and spring means interposed between the sealing member and the shell within the sealed chamber and constantly tending to distend the shell, said spring means including a plunger head conforming generally to the shape of the shell portion remote from said sealing member.

3. In a valve, casing structure having an inlet and an outlet and including a wall at least in part defining a valve chamber and having a port therein adapted when uncovered to open communication between said inlet and outlet, a valve element shiftably mounted in said chamber, and a sealing unit movable with said valve element for covering or uncovering said port, said sealing unit comprising a sealing member having an aperture therethrough and having an inner face and an outer sealing face, and a deformable resilient shell bonded to the sealing member in a recess in the inner face of said sealing member and forming a sealed chamber over the aperture, and spring means interposed between the sealing member and the shell within the sealed chamber and constantly tending to distend the shell, said spring means including a plunger head conforming generally to the shape of the shell portion remote from said sealing member, and said valve element having a recess therein in which said sealing unit is removably mounted and comprising a large portion in which the sealing member has a snug sliding fit and a smaller portion in which the shell is confined against ballooning.

ARTHUR L. PARKER.

REFERENCES CITED

The following references are of record in the file of this patent:

UNITED STATES PATENTS

| Number | Name | Date |
| --- | --- | --- |
| 313,080 | Kaiser | Mar. 3, 1885 |
| 909,400 | Guthrie | Jan. 12, 1909 |
| 1,776,288 | Livingston | Sept. 23, 1930 |
| 2,209,134 | Parker | July 23, 1940 |
| 2,209,135 | Parker | July 23, 1940 |
| 2,314,512 | Parker | Mar. 23, 1943 |